United States Patent [19]

Herd et al.

[11] Patent Number: 5,147,719
[45] Date of Patent: Sep. 15, 1992

[54] PRODUCTION OF PHENYLENE SULFIDE-ARYLENE SULFIDE/SULFONE BLOCK COPOLYMERS

[75] Inventors: Melvin D. Herd, Idaho Falls, Id.; Lyle R. Kallenbach, Bartlesville, Oreg.

[73] Assignee: Phillips Petroleum Company, Bartlesville, Okla.

[21] Appl. No.: 718,493

[22] Filed: Jun. 19, 1991

Related U.S. Application Data

[60] Division of Ser. No. 588,399, Sep. 25, 1990, abandoned, which is a continuation of Ser. No. 356,956, May 24, 1989, abandoned.

[51] Int. Cl.$^5$ .................... B32B 17/06; B32B 15/08
[52] U.S. Cl. .................... 428/332; 428/426; 428/457
[58] Field of Search .............. 428/457, 419, 426, 328, 428/332; 525/537; 528/389, 390

[56] References Cited

U.S. PATENT DOCUMENTS

| | | | |
|---|---|---|---|
| 3,919,177 | 11/1975 | Campbell | 528/389 X |
| 4,016,145 | 4/1977 | Campbell | 528/390 X |
| 4,440,915 | 4/1984 | Asakura et al. | 525/537 |
| 4,835,051 | 5/1989 | Yu | 428/328 |
| 4,921,558 | 5/1990 | Johnson et al. | 428/419 |
| 4,946,912 | 8/1990 | Kawabata et al. | 525/537 |
| 4,960,841 | 10/1990 | Kawabata et al. | 525/537 |

Primary Examiner—Thomas J. Herbert, Jr.
Attorney, Agent, or Firm—J. D. Brown

[57] ABSTRACT

Block copolymers composed of poly(phenylene sulfide) segments and poly(arylene sulfide/sulfone) segments are prepared by first polymerizing a dihalobenzene, utilizing a suitable sulfur source in the presence of a polar organic compound, to form poly(phenylene sulfide) segments then adding and polymerizing a dehaloaromatic sulfone thereby forming said block copolymer which block copolymers are employed as coatings and also are used to enhance compatibility of polymer blends.

5 Claims, No Drawings

PRODUCTION OF PHENYLENE SULFIDE-ARYLENE SULFIDE/SULFONE BLOCK COPOLYMERS

This application is a divisional application of copending application Ser. No. 07/588,399 filed Sep. 25, 1990, abandoned which was a continuation application of our original application having Ser. No. 07/356,956 filed May 24, 1989, abandoned.

FIELD OF THE INVENTION

This invention relates to the production of polymers from aromatic compounds. In one aspect, this invention relates to processes for the production of phenylene sulfide-arylene sulfide/sulfone copolymers. In another aspect, this invention relates to a process for the preparation of a block copolymer composed of at least one poly(phenylene sulfide) segment and at least one poly(arylene sulfide/sulfone) segment. In a further aspect, this invention relates to coatings comprising a block copolymer composed of at least one poly(phenylene sulfide) segment and at least one poly(arylene sulfide/sulfone) segment. In a still further aspect, this invention relates to blends of polymers comprising a block copolymer composed of at least one poly(phenylene sulfide) segment and at least one poly(arylene sulfide/sulfone) segment.

BACKGROUND OF THE INVENTION

A basic process for the production of arylene sulfide polymers from polyhalo-substituted aromatic compounds by reaction with an alkali metal sulfide in a polar organic compound is disclosed in U.S. Pat. No. 3,354,129.

Poly(p-phenylene sulfide) (PPS) has been recognized as having very useful properties related to high temperature resistance and chemical resistance. PPS while partially crystalline, is also readily adapted to a variety of processing techniques utilized for thermoplastic polymers. On the other hand, there are applications wherein the impact strength or toughness of PPS needs to be increased for further development in said applications. Thus, there is a need to provide added toughness or impact strength to compositions derived from PPS.

Aromatic sulfide/sulfone polymers are also known thermoplastic materials which exhibit high temperature resistance as well as chemical resistance. These aromatic sulfide/sulfone polymers can be made according to processes disclosed in a series of patents to Robert W. Campbell, for example, U.S. Pat. No. 4,016,145.

Blends of PPS with poly(arylene sulfide/sulfone)s have been proposed in an attempt to provide compositions exhibiting the desirable properties of both components. However, such blends have not generally been successful in the achievement of the desired improvement in properties for the PPS compositions such as toughness and reduced brittleness.

Attempts at copolymerization of mixtures of the respective halogenated aromatic compounds to provide copolymers thereof have encountered difficulties because suitable polymerization conditions for the respective monomers are sufficiently different to cause poor results to be obtained in the attempted copolymerization of mixtures of dihalobenzenes and dihaloaromatic sulfones.

It is therefore an object of this invention to provide a method for producing a block copolymer composed of at least one poly(phenylene sulfide) segment and at least one poly(arylene sulfide/sulfone) segment. It is another object of this invention to provide a step-wise process for preparing a block copolymer composed of at least one poly(phenylene sulfide) segment and at least one poly(arylene sulfide/sulfone) segment wherein the poly(phenylene sulfide) segment is first prepared and then a dihaloaromatic sulfone is added and polymerized to form the poly(arylene sulfide/sulfone) segment(s). It is another object of this invention to provide coated substrates wherein said coating comprises a block copolymer composed of at least one poly(phenylene sulfide) segment and at least one poly(arylene sulfide/sulfone) segment. It is another object of this invention to provide polymer blends comprising a block copolymer composed of at least one poly(phenylene sulfide) segment and at least one poly(arylene sulfide/sulfone) segment.

BRIEF STATEMENT OF THE INVENTION

In accordance with our invention a method is provided for producing a block copolymer composed of at least one poly(phenylene sulfide) segment and at least one poly(arylene sulfide/sulfone) segment comprising polymerizing at least one dihalobenzene in the presence of a polar organic compound utilizing a suitable sulfur source to form a poly(phenylene sulfide) and adding and polymerizing at least one dihaloaromatic sulfone thereby forming said block copolymer composed of at least one poly(phenylene sulfide) segment and at least one poly(arylene sulfide/sulfone) segment.

Our invention also provides coatings and polymer blends comprising a block copolymer composed of at least one poly(phenylene sulfide) segment and at least one poly(arylene sulfide/sulfone) segment.

DETAILED DESCRIPTION OF THE INVENTION

In one embodiment, our invention is a process for the preparation of a block copolymer composed of at least one poly(phenylene sulfide) segment and at least one poly(arylene sulfide/sulfone) segment comprising the steps of:

1) admixing at least one suitable sulfur source and at least one polar organic compound to form a first admixture;

2) adding at least one dihalobenzene to said first admixture to form a second admixture and subjecting said second admixture to suitable polymerization reaction conditions of time and temperature sufficient to produce a third admixture comprising a poly(phenylene sulfide);

3) admixing at least one dihaloaromatic sulfone with said third admixture to form a fourth admixture; and subjecting said fourth admixture to suitable polymerization reaction conditions of time and temperature sufficient to produce a fifth admixture comprising a block copolymer composed of at least one poly(phenylene sulfide) segment and at least one poly(arylene sulfide/sulfone) segment.

Any suitable sulfur source can be employed according to our invention. For example, U.S. Pat. No. 3,919,177 of Robert W. Campbell discloses a wide variety of suitable sulfur sources and their utilization in preparing p-phenylene sulfide polymers by reaction with at least one p-dihalobenzene. Preferably, suitable sources of sulfur to be employed according to our invention are selected from the group consisting of hydrogen sulfide, alkali metal sulfides, alkali metal hydrosulfides and thioamides.

Examples of suitable alkali metal sulfides include sodium sulfide, potassium sulfide, lithium sulfide, rubidium sulfide, and cesium sulfide. Examples of suitable alkali metal hydrosulfides include sodium hydrosulfide, potassium hydrosulfide, lithium hydrosulfide, rubidium hydrosulfide, and cesium hydrosulfide. Examples of suitable thioamides include thioformamide, N,N-dimethylthioformamide, thioacetamide, N,N-diethylthioacetamide, N-ethylthiopropionamide, N-cyclohexylthiobutyramide, N-isopropyl-N-phenylthiohexanamide, N-p-tolylthiooctanamide, N-benzylthiododecanamide, N-cyclopentylmethyl-3-methylcyclopentylthioacetamide, N,N-dibutylthiobenzamide, N-octyl-2-phenylthioacetamide, thio-p-toluamide, N-dodecyl-3-methylthiohexanamide, thioeicosanamide, N-nonadecylthioformamide, thiocyclohexanecarboxamide, 3-cyclopentylthiopropionamide, dithiohexanediamide, N,N'-dimethyldithioterephthalamide, 1,2-bis(thiocarbamoylmethyl)benzene, 1,2,4-tris(thiocarbamoyl)cyclohexane, 1,2,3,4-tetrakis(thiocarbamoyl)-butane, 2-azetidinethione, 2-pyrrolidinethione, 2-piperidinethione, 2-thioxohexamethylenimine, N-methyl-2-pyrrolidinethione, N-isopropyl-3-ethyl-2-piperidinethione, 4-cyclopentyl-2-pyrrolidinethione, 3-phenyl-2-azetidinethione, thiolactam of 2-aminocyclopentanecarbodithioic acid, thiolactam of 2-amino-4-methylcyclooctanecarbodithioic acid, thiolactam of 2-(methylamino)-3-cyclopentylcyclohexanecarbodithioic acid, thiolactam of 2-amino-4-phenylcyclopentanecarbodithioic acid, thiolactam of 2-aminobenzenecarbodithioic acid, thiolactam of 2-(ethylamino)-3-isopropylbenzenecarbodithioic acid, thiolactam of 2-amino-4-cyclohexylbenzenecarbodithioic acid, thiolactam of 2-amino-5-phenylbenzenecarbodithioic acid and the like and mixtures thereof.

If hydrogen sulfide or an alkali metal hydrosulfide or a thioamide is employed as at least one suitable sulfur source according to our invention, it is preferred to also employ an alkali metal hydroxide which is preferably sodium hydroxide because of availability and generally good results obtained therewith.

Any polymerizable dihalobenzene including mixtures thereof can be employed according to our invention including compounds wherein the halogen substituents are located ortho-, meta- or para- with respect to each other on the aromatic ring. For example, o-dichlorobenzene, m-dichlorobenzene, m-dibromobenzene, and the like can be employed in the process of our invention.

However, the dihalobenzenes which are preferably employed in the process of our invention can be represented by the formula

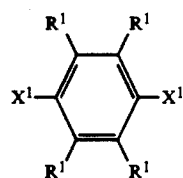

where each $X^1$ is selected from the group consisting of chlorine, bromine, and iodine; wherein each $R^1$ is selected from the group consisting of hydrogen and hydrocarbyl radicals having 1 to about 18 carbon atoms and wherein the total number of carbon atoms in said dihalobenzene is 6 to about 24.

Examples of some preferred dihalobenzenes which can be employed in the process of our invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,-6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-octyl-4-(3-methylcyclopentyl)-2,5-dichlorobenzene, and the like.

According to our invention, there can optionally be employed a small amount of at least one polyhaloaromatic compound having at least 3 halogen atoms per molecule which is added with at least one dihalobenzene. Suitable polyhaloaromatic compounds can be represented by the formula $ArX^1_t$ where Ar is an aromatic carbocyclic or heterocyclic radical wherein up to 3 ring carbon atoms can be replaced by heteroatoms selected from the group consisting of N, 0, and S; having 6 to about 17 carbon atoms; $X^1$ is halogen individually selected from the group consisting of chlorine, bromine, and iodine; and t is an integer of 3-6.

Examples of suitable polyhaloaromatic compounds include 1,2,4-trichlorobenzene; 1,2,3-trichlorobenzene; 1,2,4-tribromobenzene; 1,2,4-trichloronaphthalene; 1,2,6-triiodonaphthalene; 1,3,5-trichlorotriazine; 1,2,3,4-tetrachloronaphthalene; 1,2,4,5-tetrachlorobenzene; 2,2',4,4'-tetrachlorobiphenyl; hexachlorobenzene; 2,3,4,5,6-pentabromoethylbenzene and the like.

If employed according to our invention, the amount of at least one polyhaloaromatic compound can replace up to 2 mole percent, preferably up to 1 mole percent of the dihalobenzene used in the process.

Polar organic compounds which can be employed according to our invention include amides, lactams, and sulfones.

The polar organic compounds should be substantially liquid at the reaction temperatures and pressures employed. The polar organic compounds can be cyclic or acyclic and can have 1 to about 18 carbon atoms per molecule.

Examples of suitable polar organic compounds include hexamethylphosphoramide, 1,3-dimethyl-2-imidazolidinone, formamide, acetamide, tetramethylurea, N,N'-ethylene-dipyrrolidone, N-methyl-2-pyrrolidone (NMP), 2-pyrrolidone, ε-caprolactam, N-ethylcaprolactam, sulfolane, N,N-dimethylacetamide, diphenyl sulfone, and the like. The preferred polar organic compound due to its effectiveness and commercial availability is NMP.

According to our invention the mixing of the polar organic compound and at least one suitable sulfur source can take place in the presence of water. Water can be present from several sources in this admixture. For example, it is convenient to employ certain of the suitable sulfur sources as an aqueous mixture or as a hydrate of a sulfur containing compound. Water may also be formed from the interaction of certain sulfur sources and alkali metal hydroxides, if employed. In any event, it is preferred in such instances that the mixture of at least one suitable sulfur source and at least one polar organic compound be subjected to a dehydration step in order to remove at least a portion of the water present in the admixture prior to the addition of the dihalobenzene and subsequent polymerization. The dehydration can conveniently be conducted by distilling at least a portion of the water from the mixture under suitable conditions of time, temperature and pressure. Generally, a portion of the polar organic compound is also removed in the distillation step and this can be replaced in the mixture if so desired.

In a preferred embodiment of our invention, at least one alkali metal carboxylate is added to the mixture of at least one polar organic compound and at least one suitable sulfur source prior to the dehydration step, if employed, or prior to the addition of the dihalobenzene if a dehydration step is not employed. The alkali metal carboxylate can be employed as a hydrate or as a solution or dispersion in water.

Alkali metal carboxylates which can be employed in the process of our invention can be represented by the formula R"CO$_2$M where R" is a hydrocarbyl radical having 1 to about 20 carbon atoms and M is an alkali metal selected from the group consisting of lithium, sodium, potassium, rubidium and cesium.

Examples of suitable alkali metal carboxylates which can be employed in the process of our invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidum 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclcohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like.

According to our invention, at least one dihalobenzene optionally with at least one polyhaloaromatic compound, is added to the mixture of at least one suitable sulfur source and at least one polar organic compound which has optionally been subjected to a prior dehydration and which can contain the optionally employed alkali metal carboxylate. The reaction mixture now containing the added at least one dihalobenzene is subjected to suitable polymerization conditions of time and temperature to produce a polymerization reaction mixture containing poly(phenylene sulfide). Suitable polymerization conditions include a temperature of about 150° C. to about 350° C., preferably about 170° C. to about 280° C. and a time of about 10 minutes to about 72 hours, preferably about 1 to about 36 hours. The pressure employed is not critical although it is preferred that the pressure be sufficient to maintain the reaction components substantially in the liquid phase.

Although the ratio of reactants can vary considerably according to our invention, the molar ratio of the sum of dihalobenzene and dihaloaromatic sulfone to the sulfur source should be about 1.00:1 to about 1.15:1 and preferably about 1.01:1 to about 1.05:1.

If an alkali metal hydroxide is employed with a preferred suitable sulfur source, the amount of alkali metal hydroxide to the sulfur source will vary according to the sulfur source but generally will be about 0 to about 5 and preferably about 0 to about 4 gram equivalents per gram atom of sulfur in the sulfur source.

If at least one alkali metal carboxylate is employed according to our invention, the molar ratio of alkali metal carboxylate to the sulfur source is generally about 0.001:1 to about 1.5:1 and preferably about 0.01:1 to about 1:1.

The amount of polar organic compound employed according to our invention can be expressed in terms of a molar ratio of polar organic compound to the sulfur source. Generally, this ratio will be about 2:1 to about 25:1 and preferably about 2:1 to about 15:1.

According to one method of practicing our invention, the total amount of at least one suitable sulfur source is charged initially with the polar organic compound and other optional reagents and optionally subjected to the dehydration step as described above, followed by the addition of at least one dihalobenzene and the optional polyhaloaromatic compound, which is (are) polymerized under the conditions described above. In this embodiment, the dihaloaromatic sulfone is the only additional component required prior to the polymerization thereof to form the block copolymer composed of at least one poly(phenylene sulfide) segment and at least one poly(arylene sulfide/sulfone) segment.

According to another method of practicing our invention, a portion of the suitable sulfur source is withheld from the initial charge of reaction components and is added with, or just prior to the addition of, at least one dihaloaromatic sulfone to the polymerization reaction mixture containing the poly(phenylene sulfide). If this embodiment of our invention is employed, the amount of withheld suitable sulfur source that is added just prior to or with the dihaloaromatic sulfone can be any amount up to the molar equivalent of dihaloaromatic sulfone employed as the upper limit.

Optionally, water can also be added at this point in our process to the polymerization reaction mixture containing the poly(phenylene sulfide). The molar ratio of added water to dihalaromatic sulfone is about 0.01:1 to about 50:1 and preferably about 1:1 to about 30:1. This optional addition of water can be employed whether or not any of the sulfur source is withheld from the initial charge and added later as described above.

The dihaloaromatic sulfones that can be employed according to our invention to prepare the block copolymer composed of at least one poly(phenylene sulfide) segment and at least one poly(arylene sulfide/sulfone) segment can be represented by the formula

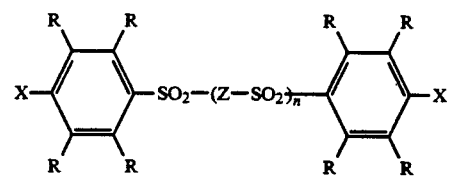

where each X is selected from the group consisting of fluorine, chlorine, bromine, and iodine; Z is a divalent radical selected from the group consisting of

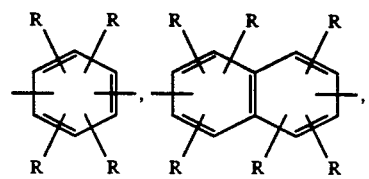

and

-continued

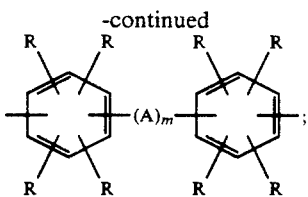

m is 0 or 1; n is 0 or 1; A is selected from the group consisting of oxygen, sulfur, sulfonyl, carbonyl and $CR_2$; and each R is selected from the group consisting of hydrogen and alkyl radicals having 1 to about 4 carbon atoms, the total number of carbon atoms in all of the R groups in the molecule being 0 to about 12.

Bis(p-halophenyl) sulfones are presently preferred in the process of our invention and can be represented by the formula

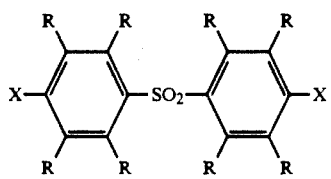

where each X is selected from the group consisting of fluorine, chlorine, bromine, and iodine, and each R is selected from the group consisting of hydrogen and alkyl radicals having 1 to about 4 carbon atoms, the total number of carbon atoms in each molecule being within the range of 12 to about 24.

Examples of some dihaloaromatic sulfones that can be employed in the process of our invention include bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl 3-methyl-4-fluorophenyl sulfone, bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl] ether, bis[p-(p-chlorophenylsulfonyl)phenyl] sulfide, bis[p-(p-chlorophenylsulfonyl)phenyl] sulfone, bis[p-(p-chlorophenylsulfonyl)phenyl] ketone, bis[p-(p-bromophenylsufonyl)phenyl]methane, 5,5-bis[3-ethyl-4-(p-chlorophenylsulfonyl)phenyl]nonane, and the like, and mixtures thereof.

The amount of at least one dihaloaromatic sulfone that is added and polymerized to form the block copolymer according to our invention can vary over a wide range but will generally be about 0.1 to about 99.9, preferably about 1 to about 99 mole percent based on dihaloaromatic sulfone and dihalobenzene. As noted hereinabove, the amount of dihaloaromatic sulfone added is taken into account in determining the amount of other reagents to be charged such as for example the amount of suitable sulfur source to be employed.

If desired, additional polar organic compound can be added with at least one dihaloaromatic sulfone to facilitate charging of this component to the polymerization reaction mixture. If additional polar organic compound is employed in this manner, the total amount of polar organic compound employed according to the process of our invention should still fall within the ranges set forth above.

Following the addition of at least one dihaloaromatic sulfone to the polymerization reaction mixture containing poly(phenylene sulfide), the resulting mixture is subjected to polymerization conditions sufficient to polymerize the dihaloaromatic sulfone thus forming the block copolymer composed of at least one poly(phenylene sulfide) segment and at least one poly(arylene sulfide/sulfone) segment.

Although polymerization conditions can vary widely for the polymerization of the added dihaloaromatic sulfone, the temperature employed will generally be about 150° C. to about 240° C., preferably about 170° C. to about 210° C. The reaction time can vary widely also and will depend in part on the reaction temperature employed but will generally be about 10 minutes to about 72 hours, preferably about 1 hour to about 36 hours. The pressure can also vary widely but should be sufficient to maintain the dihaloaromatic sulfone and the polar organic compound substantially in the liquid phase.

The block copolymer produced according to our invention can be separated from the final polymerization reaction mixture by conventional procedures, e.g. by filtration of the polymerization reaction mixture to separate the block copolymer therefrom, followed by washing with water. Alternatively, the heated polymerization reaction mixture can be diluted with water or additional polar organic compound or a mixture thereof followed by cooling and filtration and water washing of the block copolymer. Preferably, at least a portion of the washing with water is conducted at an elevated temperature, e.g. within the range of about 130° C. to about 250° C., preferably about 160° C. to about 230° C.

The block copolymers composed of at least one poly(phenylene sulfide) segment and at least one poly(arylene sulfide/sulfone) segment produced by the process of our invention can be blended with fillers, pigments, extenders, other polymers, and the like. They can be cured through crosslinking and/or chain extension by heating at temperatures up to about 480° C. in the presence of a free oxygen-containing gas, to provide cured products having high thermal stability and good chemical resistance. They are useful in the production of coatings, film, molded objects, and fibers.

According to another embodiment of our invention, we have found that block copolymers composed of at least one poly(phenylene sulfide) segment and at least one poly(arylene sulfide/sulfone) segment are particularly useful in blending with other polymers to provide compositions of good toughness and ready processability. They can be employed with particular utility as compatibility enhancing agents in blends of polymers, in particular with blends of poly(phenylene sulfide) and poly(phenylene sulfide/sulfone).

As a further embodiment of our invention, we have discovered that block copolymers composed of at least one poly(phenylene sulfide) segment and at least one poly(arylene sulfide/sulfone) segment can be utilized to form coated substrates wherein said coating comprises at least one of said block copolymers.

Any suitable substrate can be employed according to this embodiment of our invention. Preferred substrates are selected from the group consisting of metals, glasses and ceramics which melt or decompose at temperatures in excess of the curing temperature used for the coating.

Coatings comprising said block copolymer can be applied by any suitable means known in the art for applying coatings derived from poly(phenylene sulfide)s (PPS). The resulting coatings can also be cured under conditions suitable for curing PPS coatings.

Metal oxide fillers can also be employed in the coating compositions of our invention comprising at least one block copolymer composed of at least one poly(phenylene sulfide) segment and at least one poly(arylene sulfide/sulfone) segment. Preferred metal oxide fillers are selected from the group consisting of titanium dioxide, zinc oxide, magnesium oxide and oxides of iron, zirconium and hafnium.

The amount of metal oxide employed in the coating compositions of our invention is generally about 0 to about 50, preferably about 10 to about 40 weight percent based on the combined weight of all solid components of the coating composition.

The block copolymers composed of at least one poly(phenylene sulfide) segment and at least one poly(arylene sulfide/sulfone) segment which are useful in the coating compositions of our invention can be characterized as having a molar ratio of phenylene sulfide repeating units in the poly(phenylene sulfide) segment(s) to arylene sulfide/sulfone repeating units in said poly(arylene sulfide/sulfone) segment(s) of about 0.001:1 to about 1000:1, preferably about 0.01:1 to about 100:1. Suitable block copolymers can have an inherent viscosity (I.V.) of about 0.005 to about 5 dL/g, preferably about 0.1 to about 0.4 dL/g with the inherent viscosity being determined at 30° C. at a concentration of 0.5 g/dL in NMP solvent.

EXAMPLES

Examples are provided in an effort to assist one skilled in the art to a further understanding of our invention, and yet not be unduly limitative of the reasonable scope of our invention. The particular reactants, conditions, ratios, and the like, are all intended to be illustrative of our invention, and not limitative of the reasonable and suitable scope thereof.

EXAMPLE I

This example demonstrates the preparation of a block copolymer composed of poly(phenylene sulfide) and poly(phenylene sulfide/sulfone) segments by first preparing PPS followed by polymerizing in the presence thereof added bis(p-chlorophenyl) sulfone.

To a stirred, two-gallon, stainless steel reactor was charged 177.36 g (1.88 mole) of a hydrated sodium hydrosulfide containing 59.26% NaSH by weight, 75.00 g (1.875 mole) of sodium hydroxide, 153.83 g (1.88 mole) of sodium acetate and 1,635.00 mL (16.94 mole) of N-methyl-2-pyrrolidone (NMP). The reactor was flushed with nitrogen and sealed. Heating was then begun. After 43 minutes of heating, the reactor jacket temperature was 183° C. and the internal temperature was 140° C. At this point, dehydration was begun by venting the reactor and sweeping it with a gentle stream of nitrogen to assist in the removal of the volatiles. Thirty-two minutes later, at a jacket temperature of 220° C. and an internal temperature of 202° C., cooling was begun. One hour fifty-three minutes later, jacket temperature was 194° C. and internal temperature was 187° C. At this point, 206.72 g (1.41 mole) of p-dichlorobenzene in 340 mL of NMP was charged to the reactor, followed by a one-hour hold under these conditions. Following the hold, temperature was increased over a period of thirty-one minutes to 292° C. (jacket)/260° C. (internal). The temperature was held at approximately this level for approximately 15 minutes. At the end of this hold, the reactor was cooled over a period of fifty-one minutes to 185° C. (jacket)/172° C. (internal). Next, 134.61 g (0.47 mole) of bis(p-chlorophenyl)sulfone in 185.62 mL NMP was added, internal temperature raised to 185° C., and a 24 hour hold was begun under these conditions. At the end of this period, heating was discontinued and the reactor was allowed to cool to room temperature at which point it was opened and the product was washed from the reactor with water.

The product was slurried with additional water with stirring and heating to about 80° C., at which point it was filtered. This hot water wash procedure was repeated an additional four times, after which the polymer product was dried, yielding 258.38 g (96% theory) with an inherent viscosity (determined in NMP at 30° C. at a concentration of 0.5 g polymer per dL of solution) of 0.19 dL/g. This material is hereinafter referred to as Resin 1.

In view of the substantially complete conversion of added monomers, the recovered polymer can be regarded as a 25/75 (PPSS/PPS) block copolymer where the numbers 25 and 75 indicate the mole percent of the respective phenylene sulfide/sulfone and phenylene sulfide repeating units in the polymer.

EXAMPLE II

In a manner substantially like that of Example I, a 50/50 PPSS/PPS block copolymer was prepared as described hereinafter.

To a stirred, two-gallon, stainless steel reactor was charged +177.36 g (1.88 mole) of a hydrated sodium hydrosulfide containing 59.26% NaSH by weight, 75.00 g (1.875 mole) of sodium hydroxide, 153.83 g (1.876 mole) of sodium acetate and 1,635.00 mL (16.94 mole) of N-methyl-2-pyrrolidone (NMP). The reactor was flushed with nitrogen and sealed. Heating was then begun. After 53 minutes of heating, the reactor jacket temperature was 169° C. and the internal temperature was 140° C. At this point, dehydration was begun by venting the reactor and sweeping it with a gentle stream of nitrogen to assist in the removal of the volatiles. Dehydration was stopped 57 minutes after it was begun. At this point the jacket temperature was 208° C. and the internal temperature was 200° C. Twenty-five minutes later, at a jacket temperature of 205° C. and an internal temperature of 194° C., 139.20 g (0.95 mole) of p-dichlorobenzene was charged into the reactor in 150 mL of NMP. One hour later, at a jacket temperature of 194° C. and an internal temperature of 184° C., additional heating was provided to heat to 276° C. (jacket)/261° C. (internal) over a period of 42 minutes. The temperature was held at approximately this level for approximately 15 minutes.

At the end of this hold, the reactor was cooled over a period of forty-five minutes to 195° C. (jacket)/185° C. (internal). At this point, 271.95 g (0.95 mole) of bis(p-chlorophenyl)sulfone in 375 mL of NMP was charged to the reactor and a 24 hour hold under these conditions was begun. At the end of this period, heating was discontinued and the reactor was allowed to cool to room temperature at which point it was opened and the product was washed from the reactor with water.

The product was slurried with additional water with stirring and heating to about 80° C., at which point it was filtered. This hot water wash procedure was repeated an additional four times, after which the polymer product was dried, yielding 322.27 g (97% theory) with an inherent viscosity (determined in NMP at 30° C. at a concentration of 0.5 g polymer per dL of solution) of 0.18 dL/g. This material is hereinafter referred to as Resin 2.

EXAMPLE III

In a manner substantially like that of Example I, a 75/25 (PPSS/PPS) block copolymer was prepared as described below.

To a stirred, two-gallon, stainless steel reactor was charged 176.70 g. (1.88 mole) of a hydrated sodium hydrosulfide containing 59.48% NaSH by weight, 75.00 g (1.875 mole) of sodium hydroxide, 153.83 g (1.876 mole) of sodium acetate and 1,635.00 mL (16.94 mole) of N-methyl-2-pyrrolidone (NMP). The reactor was flushed with nitrogen and sealed. Heating was then begun. After 40 minutes of heating, the reactor jacket temperature was 185° C. and the internal temperature was 140° C. At this point, dehydration was begun by venting the reactor and sweeping it with a gentle stream of nitrogen to assist in the removal of the volatiles. Forty-five minutes later, at a jacket temperature of 216° C. and an internal temperature of 202° C., cooling was begun. Fifty-five minutes later, jacket temperature was 202° C. and internal temperature was 186° C. At this point, 68.90 g (0.47 mole) of p-dichlorobenzene in 113.3 mL of NMP was charged to the reactor, followed by a two-hour hold under these conditions. Following the hold, temperature was increased over a period of twenty-nine minutes to 286° C. (jacket)/260° C. (internal). The temperature was held at approximately this level for approximately 15 minutes. At the end of this hold, the reactor was cooled over a period of sixty-six minutes to 193° C. (jacket)/182° C. (internal).

Next, 403.83 g (1.41 mole) of bis(p-chlorophenyl)sulfone in 412.29 mL NMP was added and a 24 hour hold under these conditions was begun. At the end of this period, heating was discontinued and the reactor was allowed to cool to room temperature at which point it was opened and the product was washed from the reactor with water.

The product was slurried with additional water with stirring and heating to about 80° C., at which point it was filtered. This hot water wash procedure was repeated an additional four times, after which the polymer product was dried, yielding 393.31 g (98% theory) with an inherent viscosity (determined in NMP at 30° C. at a concentration of 0.5 g of polymer per dL of solution) of 0.13 dL/g. This material is hereinafter referred to as Resin 3.

COMPARATIVE EXAMPLE IV

This example demonstrates the preparation of a PPSS homopolymer.

To a two-gallon, stirred, stainless steel reaction vessel was charged 325.29 g (3.50 mole) of a hydrated sodium hydrosulfide containing 60.32 weight percent NaSH, 140.00 g (3.50 mole) sodium hydroxide, 126.00 g (7.00 mole) water, 1098.25 g (11.08 mole) N-methyl-2-pyrrolidone and 1,005.13 g (3.50 mole) bis(p-chlorophenyl)sulfone. The reactor was flushed with nitrogen and sealed. Heating at 3° C./minute was then begun. After one hour, twenty-four minutes, at 227° C. jacket temperature and 200° C. internal temperature, a three-hour hold was begun. At the end of the hold, heating was discontinued and the reactor was allowed to cool to room temperature. The reactor was then opened and the product removed and washed as in Examples I-III, giving a product with an inherent viscosity (determined in NMP at 30° C. at a concentration of 0.5 g of polymer per dL of solution) of 0.37 dL/g. The product from this example is hereinafter referred to as Resin 4.

EXAMPLE V

This example demonstrates the preparation of coatings using Resins 1-4.

Resin 1 was screened to pass 60 mesh. Seventeen and one-tenth grams of the screened resin was combined with 0.21 g of Aerosol A200 fumed silica (0.012 micron), 5.6 g of titanium dioxide and 26.7 g distilled water. This was then mixed 15 minutes on a Waring Blender at medium speed and applied to degreased (by washing in a 1:1 volume:volume xylene:acetone mixture), grit-blasted (with aluminum oxide to a #1 NACE finish), heat-treated (at 399° C. for 0.5 hour in a forced-air furnace), cold rolled steel coupons using a #60 steel Leneta rod. The coatings were then cured at 399° C. for 0.5 hour in a forced-air furnace and were then annealed 2 hours at 232° C. This coating is hereinafter referred to as Coating 1. It was tested for thickness, holidays, adhesion and hardness as detailed in Table I.

Similarly, Coatings 2, 3 and 4 were prepared from Resins 2, 3 and 4, respectively. Data on these coatings are also contained in Table I.

TABLE I*

| Coating Number | Thickness** | Holidays*** | Adhesion# | Hardness## |
|---|---|---|---|---|
| 1 | 10 | 0 | 5### | 8H### |
| 2 | 4 | 1 | 4 | 7H |
| 3 | 6.5 | 10 | 1### | 9H### |
| 4 | 15 | 20 | 1### | 2H### |

*Data listed are the average of two determinations except where otherwise indicated.
**Thickness in mils, as determined by ASTM D1186.
***Holiday testing was done with an insulation tester used for resistance measurements. This tester is a high-range ohmmeter that supplies a high voltage to the part during testing. A 0.25 square inch wet sponge was used as probe. The probe was pressed against the test panel and the number of deflections were counted per unit of a grid marked on the surface of the panel.
Adhesion testing was done by scribing an "X" shaped mark through the coating with a #22 X-Acto knife. The knife blade was then inserted into the groove and the coating pried from the surface. Ratings of 1-5 were given with 5 being the best (greatest adhesion). A 5 was given if the coating broke within itself but could not be lifted entirely from the surface. If small areas of metal were visible, but over 50% of the coating remained, a 4 was given. A 3 was assigned if small amounts of coating remained but over 50% was removed. When all of the coating was removed, a 2 was assigned. When all coating debonded without the use of a knife, a 1 was recorded.
Determined by ASTM D3363. The higher the number, the harder the coating.
Single determination.

EXAMPLE VI

This example demonstrates the use of a 50/50 (PPSS/PPS) block copolymer as a component of a polymer blend. The 50/50 (PPSS/PPS) block copolymer was prepared in substantially the same manner as Resin 2 of Example II. Specifically, it demonstrates a compatibilization effect when said block copolymer was used at relatively low levels in a blend of PPS homopolymer with PPSS homopolymer.

A blend containing a 50:50 weight ratio of PPS homopolymer (62 flow rate as measured by ASTM D1238, Procedure B, Condition 315/5.0 and prepared by the general procedure outlined in U.S. Pat. No. 3,919,177) and PPSS homopolymer (11 flow rate as measured by ASTM D1238, Procedure B, Condition 343/5.0 and prepared by the general procedure outlined in U.S. 4,016,145) with six weight percent 50/50 (PPSS/PPS) block copolymer (inherent viscosity of 0.23 dL/g determined in NMP at 30° C. and prepared by the method of this invention) was prepared using a Davis Standard extruder at 338° C. This pelletized blend (hereinafter referred to as Blend 1) was injection molded into standard ASTM test bars (using an Arburg II injection molder at 332° C. barrel temperature and 135° C. mold temperature) and tested for physical properties using standard ASTM tests.

For comparison, a similar blend was prepared omitting the 50/50 (PPSS/PPS) block copolymer. This blend is hereinafter referred to as Blend 2. It was molded and tested in the same manner as Blend 1.

The unnotched Izod impact strength of Blend 2 was measured to be 15.6 ft.-lb./in. That of Blend 1 was 62% higher (25.3 ft.-lb./in.) indicating a significant compatiblizing and toughening effect from the copolymer content of Blend 1.

COMPARATIVE EXAMPLE VII

This example illustrates the detrimental effect of charging the p-dichlorobenzene and the bis(p-chlorophenyl)sulfone together at the beginning of the polymerization step and subjecting the mixture to reaction conditions typically required to achieve the formation of poly(phenylene sulfide) segments.

To a one-liter, stirred, stainless steel autoclave was charged 46.79 g. (0.50 mole) of a hydrated sodium hydrosulfide containing 59.8 weight percent NaSH, 20.00 g (0.50 mole) of sodium hydroxide, 41.02 g (0.50 mole) of sodium acetate, 18.74 g (0.1275 mole) of p-dichlorobenzene, 109.84 g (0.3825 mole) of bis(p-chlorophenyl)sulfone and 247.83 g (2.50 mole) of N-methyl-2-pyrrolidone. The reactor was flushed with nitrogen and sealed, followed by heating to 185° C. These conditions were held for 24 hours and then the reactor was cooled and opened. The contents of the reactor consisted of a black liquid with some odor, rather than a solid polymer product present as a wet mixture with the other reactor components. The black liquid was discarded without analysis since it indicated an unsuccessful polymerization.

EXAMPLE VIII

This example demonstrates an inventive run to prepare a 75/25 (PPSS/PPS) block copolymer using shorter reaction times.

To a one-liter, stirred, stainless steel autoclave was charged 23.396 g (0.25 mole) of a hydrated sodium hydrosulfide containing 59.8 weight percent NaSH, 10.00 g (0.25 mole) of sodium hydroxide, 20.51 g (0.25 mole) of sodium acetate and 198.26 g (2.00 mole) of N-methyl-2-pyrrolidone (NMP). The reactor was purged with nitrogen, sealed and heated to 162° C. at which point dehydration was begun by collecting distillate overhead. After the collection of 8.4 g of distillate, dehydration was terminated (temperature was 185° C. at this point) and 9.28 g (0.0631 mole) of p-dichlorobenzene was charged to the reactor. The temperature was then increased to 265° C. where it was held for 15 minutes followed by cooling to 185° C. and the addition of 54.39 g (0.1894 mole) of bis(p-chlorophenyl)sulfone in 80 g (0.81 mole) of NMP. The temperature was then raised to 220° C. and held there for three hours.

Next, the reactor was cooled and opened and the product was recovered by washing with hot water and filtering six times. After drying, the product weighed 50.84 g (94.4% of theory) and exhibited an inherent viscosity (determined as in previous Examples) of 0.12 dL/g.

That which is claimed is:

1. A coated substrate wherein said substrate is selected from the group consisting of metals, glasses and ceramics and having a cured coating thereon of about 1 to about 25 mils thickness wherein said coating comprises a block copolymer composed of at least one poly(phenylene sulfide) segment and at least one poly(arylene sulfide/sulfone) segment.

2. A coated substrate according to claim 1 wherein the molar ratio of phenylene sulfide repeating units in said poly(phenylene sulfide) segment to arylene sulfide/sulfone repeating units in said poly(arylene sulfide/sulfone) segment of said block copolymer is about 0.001:1 to about 1000:1.

3. A coated substrate according to claim 2 wherein said substrate is an iron containing alloy.

4. A coated substrate according to claim 2 wherein said block copolymer is prepared by polymerizing at least one dihaloaromatic sulfone in the presence of at least one polar organic compound, at least one sulfur source, and a preformed poly(phenylene sulfide).

5. A coated substrate according to claim 4 wherein said dihaloaromatic sulfone is bis(4-chlorophenyl)sulfone and said poly(phenylene sulfide) is poly(p-phenylene sulfide).

* * * * *